Aug. 2, 1960
R. J. RAHN
2,947,083
SURFACE PLATE CALIBRATION
Filed Sept. 14, 1956
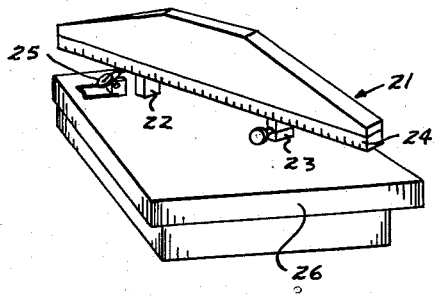
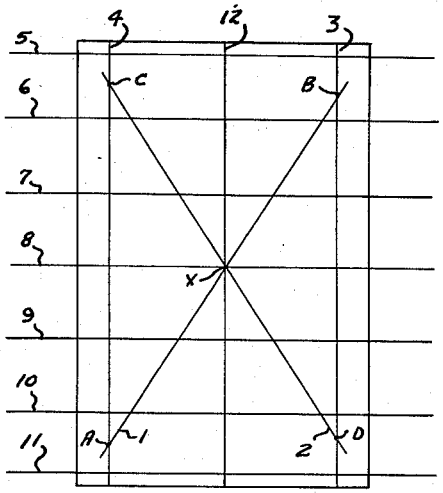
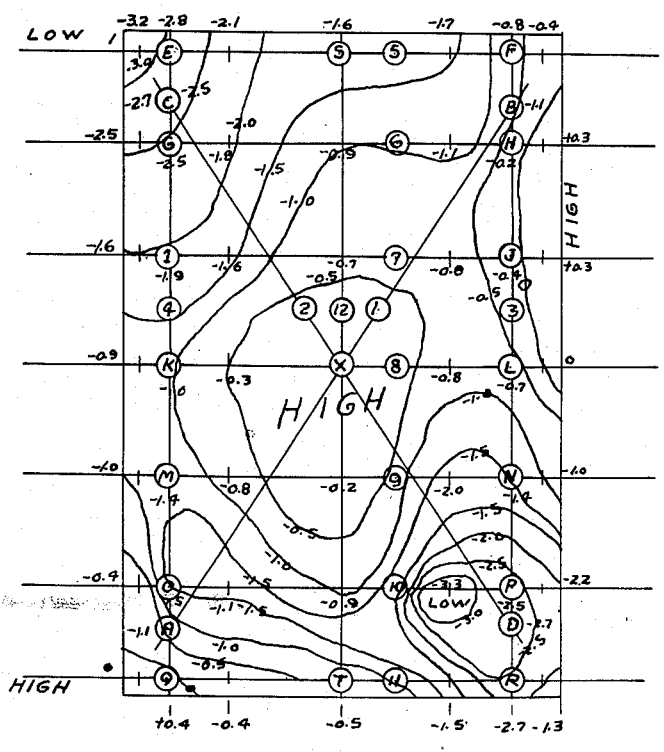
INVENTOR.
RUDOLPH J. RAHN
BY Tom Walker
ATTORNEY United States Patent Office
2,947,083
Patented Aug. 2, 1960

2,947,083

SURFACE PLATE CALIBRATION

Rudolph J. Rahn, Dayton, Ohio, assignor to Rahn Granite Surface Plate Company, Dayton, Ohio, a partnership Filed Sept. 14, 1956, Ser. No. 609,951

4 Claims. (Cl. 33—1)

This invention relates to a method and means for quickly determining surface plate error and for effecting surface plate calibration directly and accurately.

The procedures and apparatus available for surface plate calibration prior to the present invention are very involved and require extensive calculations, arithmetic conversion and reference tables. The importance of surface plates in industry is obvious due to their basic nature. The preferred means and method for calibration of these surface plates prior to this invention requires the use of an autocollimator. This is essentially an optical lens system employing both mirror and reflector elements as well as a straight edge. These elements vary in nature and size dependent on the plate to be calibrated. In the prior art procedure extensive data in the nature of readings is taken employing the autocollimator. The readings must then be individually converted and applied in a series of arithmetic calculations. These operations require highly trained personnel and the results can not be derived without a considerable time lapse. Such system is a compromise and is not economical nor does it afford the accuracy essential to economy and accuracy in use of the surface plates so calibrated. Reference is made to "The Tool Engineer" of October 1955, for detailed review of the complexity of this prior art procedure.

The subject invention eliminates all the extensive calculation requirements of the prior art. It enables a direct reading of surface plate error at any spot on a surface plate. And the calibration procedure provided may be accomplished quickly and accurately by relatively unskilled labor. The apparatus employed consists of no more than a straight edge, a solid and an adjustable support for the straight edge, and a feeler indicator.

The object of the invention is to simplify the construction as well as the means and mode of operation of surface plate calibration equipment, whereby such equipment may not only be economically manufactured, but will be more efficient and satisfactory in use, adaptable to a wide variety of applications, and be unlikely to get out of repair.

A further object of the invention is to provide a new and improved method for effecting surface plate calibration which requires no calculations.

The primary object of the invention is to provide a new and simplified method and apparatus for accomplishing surface plate calibration which reduces the time, effort and cost involved to a minimum.

A further object of the invention is to provide apparatus for effecting surface plate calibration quickly and easily with the highest degree of accuracy.

Another object of the invention is to provide an improved method of surface plate calibration affording a graphic picture of the surface plate contour by direct reading from the surface plate without the need for interpolation or conversion.

An additional object of the invention is to provide a highly simplified method of directly and graphically reproducing a surface contour without calculation which is based on the geometrical theorem that two intersecting straight lines determine a plane.

Another object of the invention is to provide improved means for effecting a simplification or surface plate calibration procedure which comprises a straight edge, a solid support, an adjustable support, and an indicator means.

A further object of the invention is to provide a method for quick determination of the presence of surface plate error.

An additional object of the invention is to provide a method of surface plate calibration and apparatus therefor possessing the advantageous structural features, the inherent meritorious characteristics, and the mode of operation herein described.

A further object of the invention is to provide surface plate calibration equipment and a method of use possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 shows a perspective view of the apparatus of the invention generally applied to a surface plate;

Fig. 2 is a plan view of the surface plate of Fig. 1 showing in a graphic form the respective positions of the straight edge of the apparatus of the invention as employed in the calibration procedure;

Fig. 3 is a graphic reproduction of a calibrated surface plate showing the actual surface plate contour thereon.

Like parts are indicated by similar characters of reference throughout the several views.

As shown in Fig. 1 of the drawings, the calibrating apparatus consists of a straight edge 21 supported by a solid block 22 adjacent one end and by an adjustable block 23 adjacent the other end. The straight edge is calibrated the length thereof at 24.

The method of calibrating a surface plate as afforded by the invention can be best described with reference to the drawings. The invention method is based on the geometrical theorem that two intersecting straight lines determine a plane. The straight edge 21, calibrated, for example, to the nearest .00001, is the straight line from which surface plate errors are to be measured. The intersecting positions of this straight edge 21 determine a plane.

In the practice of the invention, the surface plate 26 to be calibrated is first marked in pencil as shown graphically in Fig. 2 of the drawings to impose on its surface a pair of intersecting diagonals 1 and 2. These diagonals intersect at the center of the plate 26 and extend symmetrically therefrom. The plate 26 is further marked off with a series of longitudinally extending parallel lines and another series of transversely extending parallel lines which form a grid thereon and intersect the diagonals 1 and 2 in symmetrical balanced fashion. These lines so imposed on the surface plate 26 define the lines over which the straight edge 21 is to be successively located for arriving at a direct complete calibration of the plate 26 without any calculations being involved.

In application of the invention method to calibrating a 24" x 36" surface plate, for example, the straight edge 21 employed has a calibrated length of 36 inches. The straight edge is first placed on the surface plate over the diagonal 1 and on supports 22 and 23 so that the center of the straight edge coincides with, and lies over, the center of the plate, which center is denoted by the point of intersection of the diagonals 1 and 2. The supports 22 and 23 are respectively located at the 9 inch and the 27 inch marks on the straight edge in this application. The adjustable support 23 is then adjusted so that the respective ends of the straight edge over points A and B on the diagonal 1 are an equal distance above the plate 26 as determined by use of a feeler indicator 25. The indicator 25 is then inserted between the plate 26 and the straight edge at the center of the plate. The indicator is so adjusted that a zero reading is effected for this measurement at this central position of the plate. The indicator 25 is then set at points A and B on the diagonal 1 under the ends of the straight edge and readings are taken at these points. These readings are appropriately recorded on a graph or drawing, initially prepared, which reproduces the surface plate and the lines imposed thereon in the fashion indicated herein and as shown in Fig. 2 of the drawings.

The straight edge 21 is then similarly centered over the other diagonal 2 and the supports 22 and 23 are similarly placed under the straight edge inwardly of the ends thereof. The support 23 is once more adjusted and the distance of the ends of the straight edge over the plate 26 relative points C and D thereon is equalized. The indicator 25 is again placed over the zero point on the plate 26 identified by the point of intersection of the diagonals 1 and 2. The height of the center of the straight edge over the plate at this point is established as a zero reading on the indicator. The indicator 25 is then set at points C and D on diagonal 2 under the respective ends of the straight edge and the deviation of these end points from the zero distance established at the center of the plate for this position of the straight edge is read directly from the indicator and recorded at the appropriate points C and D on the graph provided.

It is noted that additional readings may be taken along each diagonal 1 or 2 with respect to the straight edge following the readings indicated for spot check of the plate. In the example provided the points B and D and points A and C are so arranged to respectively fall on longitudinal parallel lines 3 and 4 adjacent the respective sides of the plate 26.

The straight edge is then placed over the line 3 adjacent one side of the surface plate which intersects the diagonals 1 and 2 at points B and D. The supports are placed under the straight edge as in the first instances and the adjustable support 23 and indicator dial 25 are adjusted so that the readings at points B and D are the same as previously taken for the diagonal lines 1 and 2, as recorded on the drawing of the surface plate. Readings, thus referenced, are then taken by placing the indicator between the surface plate and the straight edge at succeeding stations along line 3 and preferably at the respective points of intersection of the transverse parallel lines imposed on plate 26 and the line 3. The readings so taken are each recorded at the appropriate points on the graphic reproduction provided.

The straight edge is then placed over line 4 which intersects the diagonals 1 and 2 at A and C respectively. The previously established readings for the points A and C relative the straight edge are available. The straight edge, of course, is centered over the line 4 and the support 23 and indicator 25 are adjusted so that the indicator readings between the surface plate at points A and C and the straight edge are as previously established in readings along diagonals 1 and 2.

The reference plane of the straight edge in relation to the surface plate having been established, direct readings are then taken along line 4, and preferably at the respective points of intersection of the transverse parallel lines and the line 4, with the indicator as set in establishing the distance between the points A and C and the straight edge. These readings are each directly recorded on the graph provided.

The straight edge is then placed transversely of the surface plate over the transverse lines 5 to 11 successively, each of which intersect lines 3 and 4 at previous measured reference points. Measured reference points having been established on lines 3 and 4, each of the transverse locations 5–11 of the straight edge is thus previously provided with reference points in the reference plane of the straight edge. The straight edge is successively set over each of these transverse lines 5–11 and the height of the straight edge over the previously established reference points respectively on lines 3 and 4 is established by adjustment of the support 23 an indicator 25 so that indicator readings at these points are identical with the previous recorded readings. Readings, may then be taken along the transverse lines at any desired points, preferably the points of intersection of the transverse lines with the longitudinally parallel lines on the plate. All of these readings are superimposed at the appropriate points on the graph reproduction provided.

It should be kept in mind that all these direct readings, are relative the reference plane of the surface plate and directly indicate the deviation or error in the surface plate at the reading points.

The results of this calibration may be verified by placing the straight edge over the longitudinal center line of the surface plate parallel to the sides thereof. The support 23 and indicator 25 are then adjusted so that the readings at both ends of the straight edge are the same as previously determined by measurement along the transverse lines. When the indicator is placed between the straight edge and the surface plate at the center of the plate, the reading should now be zero within the tolerance of the indicator used. Additional checks may be obtained along the longitudinal center line against previous readings at the various transverse lines. It will be found that maximum accuracy is provided in this measurement system.

The drawing or graph as employed in accordance with the invention now has recorded thereon series of direct measurements of deviations relative the true plane of the surface plate. The deviations are clearly obvious and directly readable at each measured point and show the amount of variation in the contour of the surface plate, noting the example of Fig. 3 of the drawings. By connecting points of equal error, which have been directly read from the indicator and imposed on the graph provided, a complete contour map of the surface plate is provided.

By actual practice this 24" x 36" surface plate may be calibrated thoroughly and directly in a period of 45 minutes. No calculations are involved. If done properly, the only possible error is straight edge error, which may be simply provided for by taking into consideration the calibration of the straight edge.

For surface plates larger than the straight edge used, the reference plane may be easily extended by placing half of the straight edge over two points along lines for which readings have been previously taken, in extending relation thereto. The support 23 and the indicator are adjusted so that the previously determined readings are again obtained for those points. This places the straight edge in the common reference plane of the diagonals and further readings may be taken between the surface plate and the straight edge along each of the extended portions thereof.

It is noted that periodic spot checks of surface plates may be made by taking readings along the diagonals only, as previously described, once the straight edge has been equalized relative the respective diagonals. By doing this it may be quickly seen whether there is a considerable deviation from the zero position at the center of the plate along respective diagonals and it will reveal whether a more detailed check and possible refinish of the surface plate is necessary.

While a particular sequence in the calibration has been specified in the example illustrated and described, it will be noted that the sequence may be varied as long as a reference plane is established in a manner similar to that as provided herein. For example, by providing pairs of readings along the diagonals on equalizing the distance of the ends of the straight edge from the surface plate, any pair of the references so established in the reference plane may serve as a basis for establishing a transverse or longitudinally intersecting line therebetween to provide any additional reference for obtaining point deviations of the surface plate from a true plane.

It will be noted that once diagonals 1 and 2 are established and the straight edge properly positioned and measured relative the diagonals on the surface plate as described, there will be two intersecting straight edges in effect determining a true reference plane and all of the indicator readings are direct readings of surface plate deviations or errors from a true plane.

A surface plate calibration procedure has been thus simply and effectively provided without the need for calculation. As seen in Fig. 3 of the drawings, by recording, on a graphic simulation of the surface plate, each indicator reading as taken, a visual and factual picture of the precise error in the surface plate is present as well as the complete contour of the surface plate.

In order to maintain the straight edge as accurate as possible, it is supported, during the various readings, at, or approximately at, the points of support used during initial calibration of the straight edge.

From the above description it will be apparent that there is thus provided a device and method of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but a few of the several modes of putting the invention into effect.

Having thus described my invention, I claim:

1. A method of calibrating surface plates including, successively setting a straight edge having a fixed and adjustable support on a surface plate in positions establishing a series of intersecting lines in a plane referenced to a common central point, establishing readings referenced to said central point at intersections of said lines of the distance between the surface plate and said plane setting an indicator to a reading established at one of the intersections as referenced to said common central point and establishing one end of the straight edge above said intersection to conform to the reading of the indicator while setting the other end of the straight edge over another intersection so the indicator as set will read the established reading there and, with the straight edge so positioned, moving the indicator as set to intermediate selected points under said straight edge and directly recording the distance between the surface plate and the straight edge to immediately determine whether or not the surface plate defines a true plane.

2. A method of calibrating a surface plate comprising, inscribing a surface plate and a sheet of paper with identical diagonals intersecting at the centers thereof respectively, setting a straight edge over one of said diagonals on the surface plate in centered relation thereto, adjusting the straight edge to have its extremities at substantially equal distances from the surface plate, irrespective of the plate contour, setting an indicator at the center of the surface plate and establishing the vertical distance between the straight edge and the plate at this point as a zero reference on the indicator, with the indicator so zeroed establishing the vertical distance of the respective ends of the straight edge from the surface plate as referenced to said vertical distance at the center and recording such deviations from zero as occur on the indicator at corresponding points on the sheet of paper, establishing the vertical distances of various points on said one diagonal from the straight edge with the indicator so referenced and recording them on the paper at corresponding points, setting the straight edge over the other diagonal in centered relation thereto and repeating the procedure employed with respect to the first diagonal using the same zero reference point, taking a point on each of said diagonals where a reading has been established and orienting the straight edge over said points so the indicator will record the previous readings at those points and with the indicator so set taking further readings at selected points between the straight edge and the surface plate and recording said readings at appropriate points on the sheet of paper and repeating this procedure utilizing any two points previously recorded whereby a contour map of the surface plate may be directly reproduced on the sheet of paper.

3. A method of calibrating a surface plate including supporting a straight edge over a surface plate in a plurality of relatively crossing diagonals having a common crossing point, establishing the crossing point of the straight edge as a common zero reference point, determining the elevation of the ends of the straight edge from the plate relative to the reference point in each of the crossing positions so as to determine a reference plane over the surface plate, including the same zero reference point, taking a point on each of said diagonals where a reading has been established and orienting the straight edge over said points so the indicator will record the previous readings at those points and with the indicator so set taking further readings at selected points between the straight edge and the surface plate thus establishing vertical distances of points on the surface plate from the straight edge so referenced to the vertical distance of said common point from the surface plate to thereby provide for direct calibration of the surface plate.

4. The method as set forth in claim 1 characterized by the further steps of initially preparing a graphic picture of the surface plate with the crossing positions of the straight edge thereon, directly recording each reading taken of the distance between the straight edge and the surface plate on the picture of the surface plate at points corresponding to the points where the readings are taken, and connecting points having readings of a similar value to thereby complete a contour map of the surface plate.

References Cited in the file of this patent

UNITED STATES PATENTS

| | | |
|---|---|---|
| 944,462 | Osborne | Dec. 28, 1909 |
| 2,083,841 | Hall | June 15, 1937 |
| 2,430,637 | Hayward | Nov. 11, 1947 |
| 2,547,087 | Mulligan | Apr. 3, 1951 |
| 2,547,647 | Levesque | Apr. 3, 1951 |

OTHER REFERENCES

Pages 293, 302 and 303 of Industrial Inspection Methods, a book by L. C. Michelon published by Harper and Brothers, New York, copyright 1950. (Copy in Div. 66.)